United States Patent [19]
Kerns et al.

[11] Patent Number: 5,367,332
[45] Date of Patent: Nov. 22, 1994

[54] DIGITAL CAMERA WITH TIME BRACKETING FEATURE

[75] Inventors: Charles Kerns, Half Moon Bay; Eric Zarakov, Los Gatos; Thomas S. Gilley, Pleasanton, all of Calif.

[73] Assignee: Apple Computer, Inc., Cupertino, Calif.

[21] Appl. No.: 959,206

[22] Filed: Oct. 9, 1992

[51] Int. Cl.⁵ .............................................. H04N 5/225
[52] U.S. Cl. ................................... 348/61; 348/207; 348/231
[58] Field of Search ............... 358/209, 108, 105, 332, 358/213.11; 348/61, 143, 207, 231

[56] References Cited

U.S. PATENT DOCUMENTS

| | | | |
|---|---|---|---|
| 4,054,752 | 10/1977 | Dennis, Jr. et al. | 358/108 |
| 4,281,354 | 7/1981 | Conte | 358/105 |
| 5,229,850 | 7/1993 | Toyoshima | 358/108 |

Primary Examiner—Joseph Mancuso
Assistant Examiner—Wendy R. Greening
Attorney, Agent, or Firm—V. Randall Gard

[57] ABSTRACT

A digital still image camera having a memory means functioning as a ring buffer. Image and sound acquisition and storage begins upon a first command signal from the camera's operator and continues at a defined rate until the operator generates a second command signal. During the time period between the first and second command signal, images are taken and stored at the defined rate, the newest image overwriting the oldest image within the ring buffer after the ring buffer is initially filled. After generating the second command signal, the operator can review the contents of the ring buffer on a display and speaker incorporated into the camera, selecting those images and sounds the operator wishes to store permanently, and then directing that the selected images and sounds be placed in the camera's long term storage memory.

5 Claims, 2 Drawing Sheets

DIGITAL CAMERA WITH TIME BRACKETING FEATURE

BACKGROUND OF THE INVENTION

This invention is in the field of digital image acquisition, manipulation, and storage.

Every photographer knows the frustration of "just missing" a wonderful shot. All too often, the camera's shutter is tripped after the most exciting moment of the on-going action has passed. Despite a great deal of inventive effort, this problem has not been solved to the full satisfaction of photographers.

Many known still cameras can be equipped with motorized film drives, which enable the camera to take a series of photographs after the camera's shutter has been tripped, the drive automatically advancing the film and tripping the shutter at a preset rate for a preset number of pictures. Although such cameras and drive units allow the photographer to take a larger number of photographs in a given time than could be taken by manually tripping the shutter for each photograph, the problem of missing the "high point" of the action still remains, as the photographer only obtains images after the shutter has been tripped. Events occurring before the shutter was tripped escape capture. Tripping the shutter in anticipation of an event is possible, but not without the risk that the anticipated event will not occur and that the film so used will be wasted.

A video camera can be used to film and store an entire event, with post-capture editing finding and storing those particular images the photographer wishes to save. Although this use of a video camera can result in a series of video frames containing the desired image, extensive editing is required to find the desired image, separate it, and store it as a separate digital image. Although several video cameras have an indexing capability which allows the photographer to place a cuing mark on the videotape, indicating a moment of particular interest, the mark is still placed on the tape after the interesting event has occurred. It therefore merely reduces the time needed to find the desired image without eliminating the need for editing to select and save the image.

SUMMARY OF THE INVENTION

A first preferred embodiment of the present invention comprises a digital still camera with a memory capable of storing a set of still images. The memory operates as a ring buffer, wherein the oldest stored image is overwritten by the most recently acquired image after the buffer is filled. The camera's shutter button has two positions, ready and picture taking. When the shutter is in the ready position, the camera begins to take a series of pictures, each picture being captured and stored in the ring buffer. This process continues until the shutter is placed in the picture taking position, at which time the camera may take one or more pictures and then stop. The contents of the ring buffer are at that moment frozen, allowing the user to review the buffer's contents and select for permanent storage the desired images.

In both the first and other embodiments, the user will be allowed to select how often the camera acquires a new image while in the ready operating mode. The user will select the frequency based on such factors as the type of event being photographed, the maximum speed that data can be transferred from video RAM to the ring buffer and the size of the memory. Given that a fixed amount of memory will be available for use as the ring buffer, the user must also select the size of the images to be stored, the selected size and the image taking frequency determining the total number of images that can be stored.

The present invention will now be described in detail with reference to the figures listed and described below.

BRIEF DESCRIPTION OF THE ILLUSTRATIONS

DETAILED DESCRIPTION OF THE PREFERRED EMBODIMENT

Figure 1:
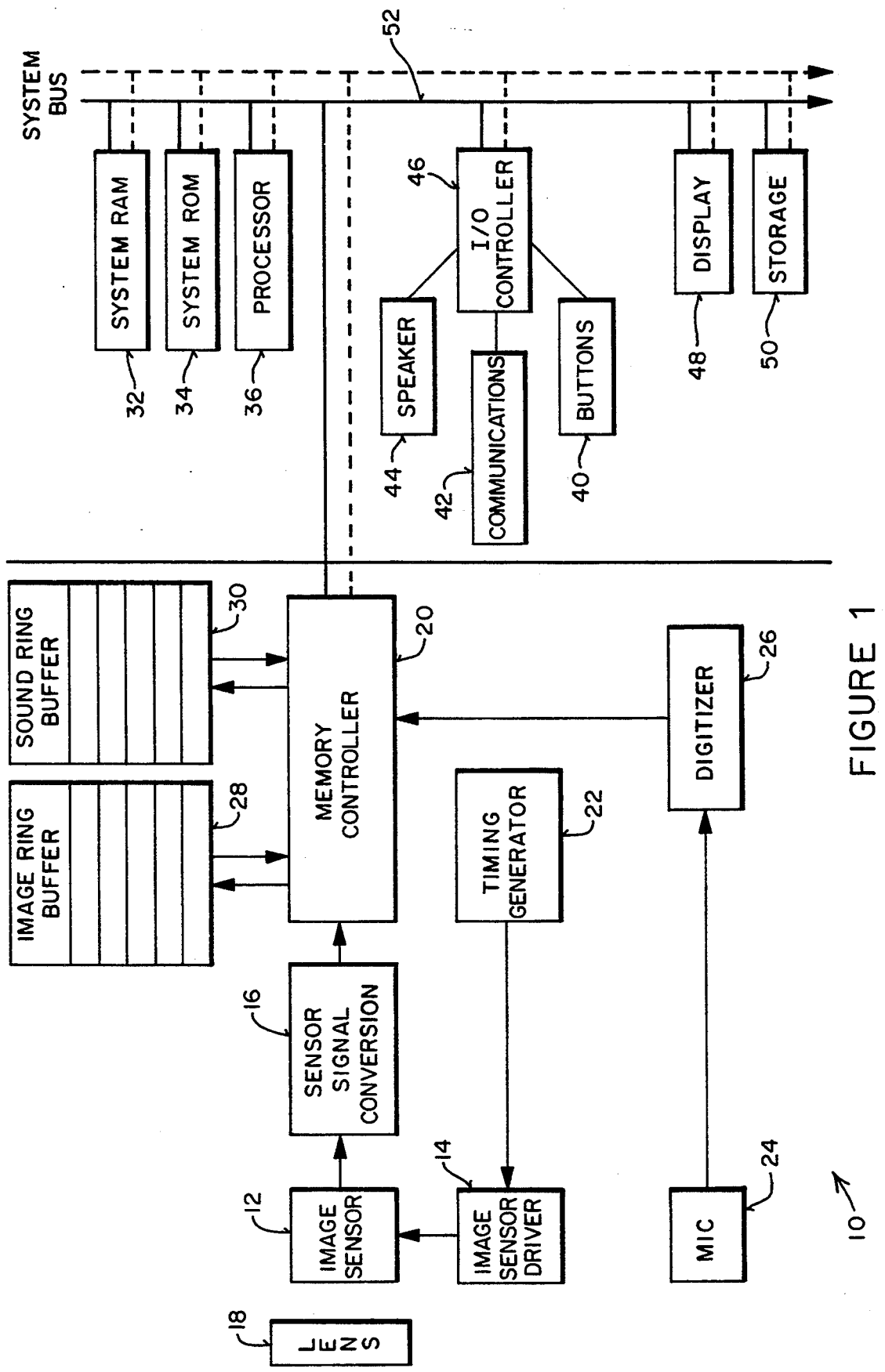
FIG. 1 is a block diagram of a first embodiment of the present invention.

A block diagram of the present invention is shown in FIG. 1. Image capture is performed by image sensor 12 which may be any type of commercially available electronic image capture means including a charge coupled device ("CCD"), a charge injection device ("CID"), or a MOS device. Lens 18 focuses images upon image sensor 12, which, coupled to and under the control of image sensor driver 14 and its timing generator 22, generates image data which is converted into a digital format in sensor signal conversion means 16.

As images are captured, sound can also be captured by microphone 24 which is coupled to digitizer 26, which converts the captured sound to a digital signal.

Both the digitized images created in sensor signal conversion means 16 and the digitized sound created in digitizer 26 are supplied to memory controller 20, which directs their flow respectively into image ring buffer 28 and sound ring buffer 30. Buffers 28 and 30 are conventional computer memories which are software controlled to act as ring buffers. In such buffers, the oldest item stored is continually being overwritten by the newest incoming item. The design and construction of such buffers is known. Such a use of computer memory is known. Other methods of memory organization could also be used.

The present invention is controlled by processor 36. Processor 36 is a known, commercially available microprocessor. In this first embodiment of the present invention it comprises a Motorola 68040 microprocessor. Those aspects of its operation which are relevant to the present invention will be described below. Processor 36 is coupled to the other components of the present invention by means of system bus 52 and controls their operation in the manner described below. System ROM 34 holds the operating instructions for processor 36 and system RAM 32 provides the working memory space for processor 36.

Memory controller 20 is coupled to system bus 52 and controls the flow of image and sound data into and out of the ring buffers to other components, including processor 36, display 48 and storage 50. Display 48 may be an LCD or CRT panel and storage 50 may be a CD, hard disk, floppy disk or memory card. Other types of displays and storage could be substituted without departing from the teachings of the present invention.

I/O controller 46 allows the user of the present invention to select various parameters such as image size and the number of images to be captured in a given time interval. It also serves as the "shutter" control, allowing the user to place the present invention in its ready and picture taking modes. Sound can also be sent to speaker 44 through I/O controller 46.

Figure 2:
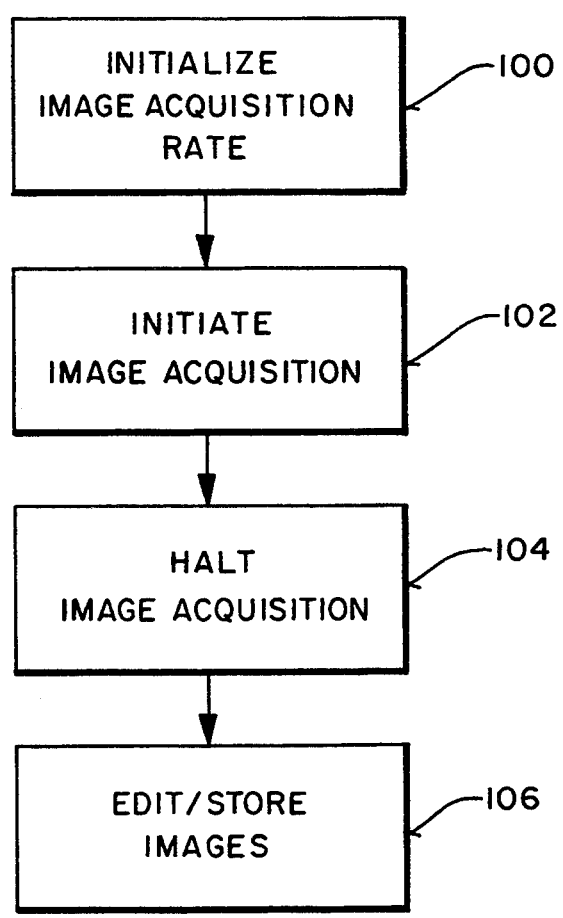
FIG. 2 is a flow chart showing the operation of the present invention.

The operation of the present invention will now be described with reference to the flow chart shown in FIG. 2. Prior to taking photographs, the user will initialize certain operating parameters pertaining to the image and sound ring buffers. This occurs at step 100. Here the user determines how many images will be "shot" in a single second, the number of seconds during which pictures will be taken, the number of pictures to be taken after the shutter is pressed and the size of these images. Although the number of images is constrained by the size of the ring buffer, capturing up to 6 images a second is possible in the first embodiment.

After initialization step 100, the camera is ready for use. At step 102, the user places the camera in its "ready" state by pushing buttons 40 into a first "ready" position. The camera then begins to take a series of photographs and records a series of sound fragments at the specified rate, first filling, and then over-writing the contents of the ring buffers.

When the user decides that the high point of the action has just occurred, he then presses buttons 40 at step 104, placing the camera in a mode where the user selected number of additional pictures is taken, with the camera halting storage of all video and sound capture operations thereafter. At step 106, the user reviews the contents of the ring buffers, selecting all images and sounds which he decides are worth saving permanently, and then orders their long-term storage in storage 50.

Although the invention has been described with reference to a specific exemplary embodiment, various modifications and changes may be made without departing from the broader spirit and scope of the invention as set forth in the appended claims. For example, it would be possible to create a plurality of memories operating like ring buffers, each being filled sequentially, with the last of these plurality of memories being filled before the images in the first memory are overwritten. In another embodiment the user would be able to select still images from a video source. As stated, the rate of image capture can be varied almost infinitely, allowing the camera's use in time-lapse photography. If a large enough secondary storage memory is available, images could be directed into it directly, without any intermediate sorting. Given these and other, readily envisioned modifications to the present invention, the specification and figures are to be regarded as illustrative rather than restrictive.

What is claimed is:

1. A digital still image camera for taking and storing still photographs comprising:
    image capture means for capturing images;
    digitizing means coupled to the image capture means for converting the images to digital images;
    first memory means for storing a plurality of digital images, the first memory means being coupled to the image capture means, the first memory means storing a user defined number of digital images, with successive digital images being written over older stored digital images when the user defined number of stored digital images is exceeded;
    processor means coupled to the image capture means and the first memory means for controlling the number of images taken by the image capture means and the number of digital images stored by the first memory means; and
    second storage means for permanently storing digital images selected by a user from the first memory means, the second memory means being coupled to the processor means.

2. The digital still image camera of claim 1 further comprising:
    microphone means for capturing sounds; and
    sound digitizing means for converting the captured sounds to digital sound recordings, the sound digitizing means being coupled to the processor means and the first memory means.

3. The digital still image camera of claim 1 wherein the first memory means is organized and operated as a ring buffer memory means.

4. The digital still image camera of claim 1 wherein a display means is coupled to the processor means for displaying digital still images stored in the first and second memory means.

5. A method for acquiring and storing digital still images comprising the steps of:
    acquiring a first still image at a first defined rate upon receiving a first command signal;
    converting the first still image to a digital still image;
    storing the first digital still image in a memory;
    acquiring, converting, and storing successive digital still images at the first defined rate, the most recently acquired digital still image replacing the oldest stored digital still image after the memory is full; and
    stopping the acquisition, conversion and storage of digital still images after receiving a second command signal the acquisition, conversion and storing of digital still images continuing for a user defined period of time after the second command signal is received.

* * * * *